United States Patent [19]

Vitalini

[11] 4,181,859
[45] Jan. 1, 1980

[54] RETICLE DEVICE APPLICABLE TO FLEXIBLE RADIOGRAPHIC FILMS

[76] Inventor: Pier Luigi Vitalini, Via Alassio 30, Turin, Italy

[21] Appl. No.: 891,352

[22] Filed: Mar. 29, 1978

[30] Foreign Application Priority Data

Apr. 8, 1977 [IT] Italy .................. 67781 A/77

[51] Int. Cl.² .............................................. H05G 1/28
[52] U.S. Cl. .................................. 250/476; 250/475.1
[58] Field of Search ................................ 250/476, 475

[56] References Cited

U.S. PATENT DOCUMENTS

| | | | |
|---|---|---|---|
| 1,168,177 | 1/1916 | Yoanna | 250/476 |
| 3,770,956 | 11/1973 | Johnson | 250/476 |
| 3,848,136 | 11/1974 | Seldin | 250/476 |

Primary Examiner—Craig E. Church
Attorney, Agent, or Firm—Sughrue, Rothwell, Mion, Zinn and Macpeak

[57] ABSTRACT

In order to superimpose a millimetric measurement reticle on an exposure of a flexible radiographic film of the kind used in dentistry this invention provides a reticle device having a reticle printed on one side of a flexible support layer in radio-opaque ink, the other side of the support being self-adhesive for application to the film. A protective insoluble layer covers the printed reticle, and removable cover strips preferably cover the self-adhesive side of the device, to protect the adhesive layer until the device is about to be used.

1 Claim, 3 Drawing Figures

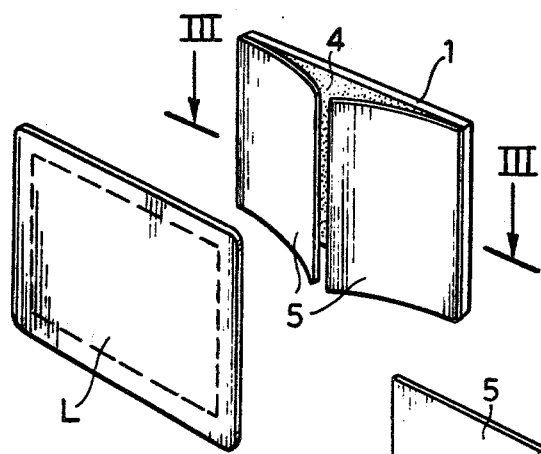
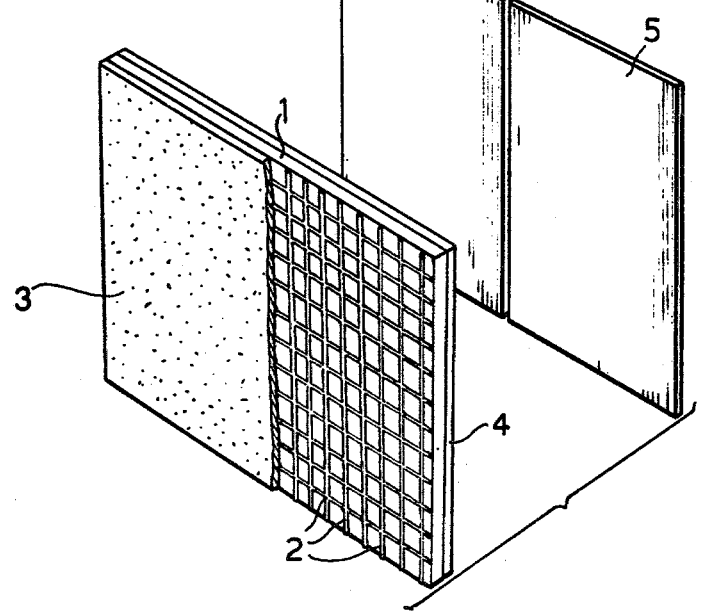
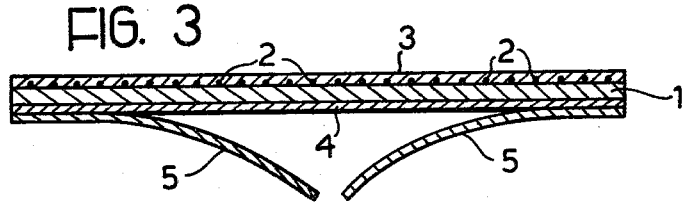

RETICLE DEVICE APPLICABLE TO FLEXIBLE RADIOGRAPHIC FILMS

This invention relates to a reticle device for application to a flexible radiographic film for use in dentistry in order to obtain on the exposed film the image of a measurement reticle or grid.

Reticle devices are known which are formed by a plate of rigid moulded plastics material in which a reticle or grid of copper wires is incorporated. Such devices, being rigid, are not amenable to the deformations imposed on radiographic films used in dentistry, so that the image of the reticle obtained on the exposed film does not allow exact distance measurements to be carried out because the reticle has not undergone the same deformations as the film.

Furthermore, known devices present problems both as regards their attachment to the radiographic film and their sterilization after each use.

An object of the present invention is to provide a reticle device for use in association with flexible radiographic films which avoids the aforementioned disadvantages.

According to the present invention there is provided a reticle device for application to flexible radiographic films for use in dentistry to obtain, on the exposed film, a measurement reticle, characterized in that the device comprises:

(a) a flexible support sheet of dimensions substantially corresponding to those of a radiographic film;

(b) a measurement reticle printed in radio-opaque material on one side of the support sheet;

(c) a self-adhesive layer applied on the opposite side of the support sheet from the reticle, and (d) a removable cover of anti-adhesive material applied to the self-adhesive layer.

Preferably a protective layer, insoluble in water and saliva, covers the reticle on said one side of the support sheet. This prevents the radio-opaque ink of the reticle coming into contact with the mouth when the film is used in dentistry.

The reticle device of the present invention enables accurate measurements to be carried out on the exposed film by means of the reticle or grid image which appears superimposed on the exposed film, even if the film has undergone substantial deformations during exposure, since the flexible support sheet of the device will have followed faithfully the deformations of the film.

The device of the present invention can moreover be fixed easily and securely to a film wrapper by means of the self-adhesive layer. The device does not require sterilization after its first use, since it is intended to be used only once: after use, the device is thrown away together with the wrapper of the radiographic film to which it was affixed.

The invention will be further described, by way of nonlimiting example, with reference to the accompanying drawings, in which:

FIG. 1 is a perspective view of a reticle device according to one embodiment of the invention and a radiographic film for use in dentistry, before the application of the device to the film;

FIG. 2 is a perspective exploded view of the reticle device, on an enlarged scale, and FIG. 3 is a cross section on an enlarged scale taken on line III—III of FIG. 1.

The illustrated reticle device is intended to be affixed to a flexible wrapper L, generally of paper, containing a flexible radiographic film, of the type used in dentistry.

The reticle device comprises a flexible support sheet 1, of paper or plastics material, having measurements substantially corresponding to those of the film to which the device is to be applied.

The support sheet 1 is printed on one side with a measurement reticle 2 in the form of a millimetric grid, using ink which is radio-opaque. The printing of the reticle 2 may for example be effected by silk-screen printing using an ink comprising a base of polyvinyl chloride saturated with a lead oxide.

To the reticle 2 there is applied a protective layer 3, insoluble in water and saliva, which prevents the radio-opaque ink coming into contact with the mucous membranes of the mouth cavity. The protective layer 3 may for example consist of a varnish having an alkyd resin base or a film of plastics material, for example polyester film.

On the opposite side of the support sheet 1 from the protective layer 3 there is applied a layer 4 of self-adhesive material protected by two removable cover sheets 5 of anti-adhesive material placed side by side in edge to edge abutment. When the device is to be used, the two cover sheets 5 are peeled off after first exposing the mutually adjacent edges of the sheets 5 by flexing of the support sheet 1 in a sense to render the surface layer 4 slightly convex. FIG. 1 shows the cover sheets 5 in the process of being removed.

After having removed the two cover sheets 5, the face of the device which carries the self-adhesive layer 4 is placed against the wrapper L of the radiographic film and stuck to the wrapper L by the application of pressure.

When the film is used the reticle device, being very thin and flexible, adapts itself to the deformations of the film when the latter is placed in the mouth cavity to be exposed to X-rays.

After the use the device is disposed of together with the wrapper L of the radiographic film.

I claim:

1. Reticle device for application to a flexible wrapper having a radiographic film therein for use in dentistry, the device comprising:

a flexible support sheet of dimensions substantially corresponding to those of the radiographic wrapper film;

a measurement reticle printed in radio-opaque material on one side of the support sheet;

a protective layer, insoluble in water and saliva, covering the reticle on said one side of the support sheet;

a self-adhesive layer applied to the opposite side of the support sheet from the reticle, and removable cover means of anti-adhesive material applied to the self-adhesive layer whereby upon removal of said cover means said reticle device may be secured to said wrapper by said self-adhesive layer.

* * * * *